Figure 2:
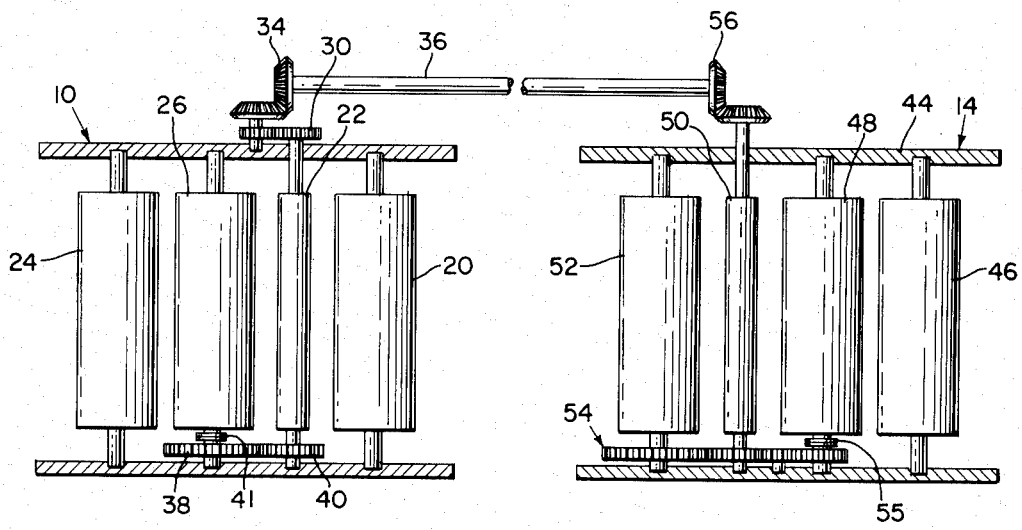

Dec. 7, 1965        C. C. VOGT        3,221,597

ROLL TAPE COPY MACHINE

Filed Oct. 9, 1963

INVENTOR.
CLIFFORD C. VOGT

BY

*George J. Rubens*

ATTORNEY

United States Patent Office 3,221,597
Patented Dec. 7, 1965

3,221,597
ROLL TAPE COPY MACHINE
Clifford C. Vogt, Rte. 1, Box 511, Mount Pleasant, S.C.
Filed Oct. 9, 1963, Ser. No. 315,094
1 Claim. (Cl. 88—24)
(Granted under Title 35, U.S. Code (1952), sec. 266)

The invention described herein may be manufactured and used by or for the Government of the United States of America for governmental purposes without the payment of any royalties thereon or therefor.

This invention relates to photographic equipment, and more particularly to a machine for reproducing accurately a continuous picture of a record to be copied.

In the testing of various equipment, it becomes necessary to analyze performance data of tests, which, for example, may be in the form of a roll of white oscillograph paper tape on which is recorded black traces representing data obtained during a test operation or the like.

One prior method for duplicating nontransparent tapes of this type required that both the tape being copied and a sensitized piece of paper be sandwiched together and subjected to a light source. In this method, the light passes through the traces on the tape and then through the paper backing before it contacted the emulsion of the sensitized paper. In passing through the paper backing, the light was dispersed to such an extent that the copy was blurred and unsatisfactory for picking off accurate measurements. The quality of a contact print device can be improved by arranging the tape and paper in a manner that the traces on the oscillograph tape and the emulsion of the copy paper are in contact. This procedure, however, produces a mirror image copy which is difficult to read.

The present invention overcomes the disadvantages heretofore described in a simple and effective manner. The copy apparatus includes a tape transport magazine for housing the tape to be copied, and a spaced-apart sensitized film magazine. Both magazines are driven at the same speed and in the same direction by a common drive mechanism. The image is reflected and also reversed, by a single 45° mirror to be in the original order on the film, and then passed through a lens to obtain a desired size of reproduction. From the lens the image passes through an exposure slot on to the sensitized film. The unexposed copy film is moved past the exposure slot at the same rate of speed and in the same optical direction as the oscillograph film which is being copied. The camera shutter is open throughout the entire filming operation. With the unexposed film moving in the same direction as the image, a continuous and precise reproduction is produced for the entire length of the film.

One object of this invention is to provide a copying machine that will accurately copy nontransparent paper tape.

Another object is to copy such tape in a continuous picture.

Still another object is to reproduce such tape easily, quickly and inexpensively.

A further object is to provide an oscillograph tape reproducer that utilizes the same film or tape and developing process as the original record to be copied.

Figure 1:
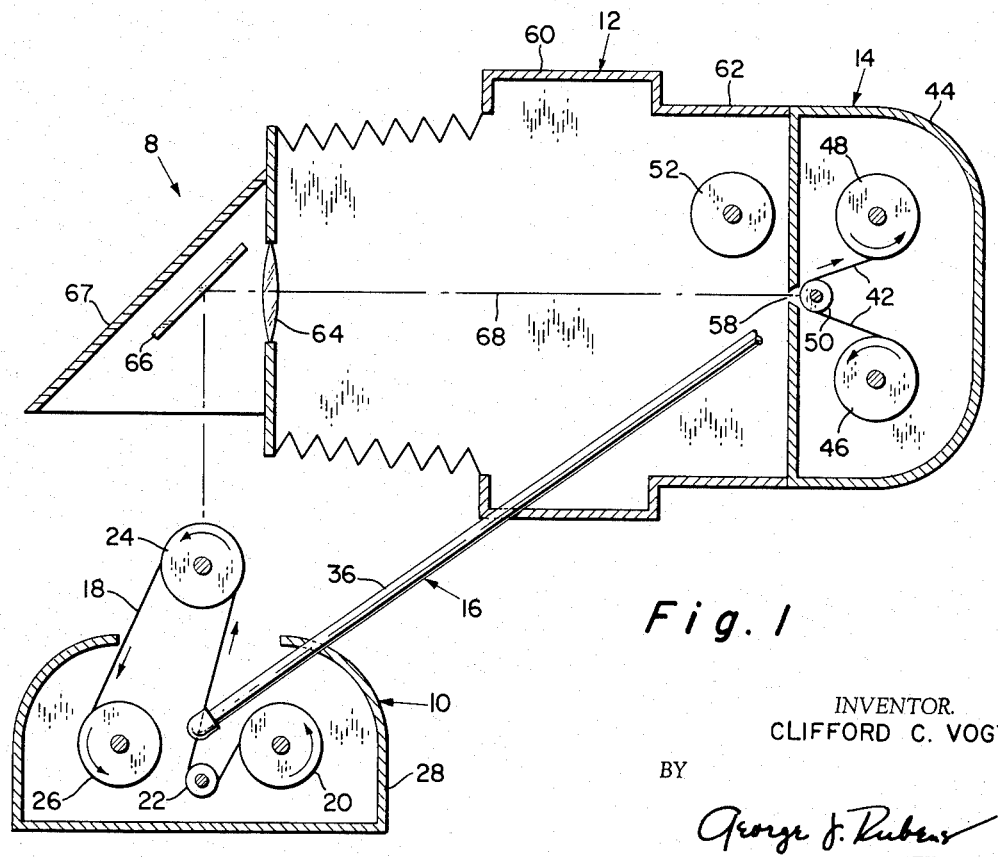

Other objects, advantages, and novel features of the invention will become apparent from the following detailed description of the invention when considered in conjunction with the accompanying drawings wherein:

FIG. 1 is a sectional plan view, of the film copy apparatus with the covers removed; and FIG. 2 is an elevation view, partially in section, of the driving gear connection between the tape transport magazine and the unexposed film magazine, the rollers and spools of both magazines being laterally displaced for illustration purposes, and the tape being omitted.

Referring to the drawing where like reference numerals refer to similar parts there is shown in FIG. 1, a copy machine 8 which comprises essentially a tape transport magazine 10, a camera 12, an unexposed copy film magazine 14 attached to camera 12, and a drive mechanism 16 for driving both magazines.

Tape transport magazine 10 houses the tape to be reproduced, such as a conventional oscillograph paper tape 18 upon which data has been recorded, one popular size being 3⅝ inches wide and 50 feet long. Tape 18 is movably supported, in the following sequential order from a storage spool 20, thence to a driver roller 22, an exposure roller 24 and a take-up spool 26. The direction of tape movement is indicated by the arrows. The spools and rollers are journalled at both ends to a magazine frame 28. Referring to FIG. 2, drive roller 22 is rotated by a pair of spur gears 30, a pair of bevel gears 34, operatively connected to drive shaft 36. It should be noted that exposure roller 24 is laterally displaced in FIG. 2 from its actual position in FIG. 1 to more clearly illustrate the gearing arrangement. Shaft 36 is a part of the common drive mechanism 16 from the unexposed film magazine 14 which will be hereinafter described. Take-up spool 26 is also driven by drive roller 22 through a set of spur gears 38 and 40, respectively at the bottom end of magazine 10. A friction clutch 41 is connected in the gearing to take-up spool 26. The clutch is designed to constantly slip to keep the tape tight around the driver roller and ensure a positive drive.

The unexposed copy film magazine 14 contains a roll of photosensitive paper film 42 on which the indicia from tape 18 is to be duplicated. Magazine 14 comprises a frame 44 which supports a storage spool 46, a take-up spool 48, and a driver roller 50; the spools and rollers being journalled at upper and lower ends to frame 44. The direction of movement of the paper film is indicated by arrows. Take-up spool 48 and driver roller 50 are driven by a motor 52 through a train of suitable spur gears 54, located at the lower end of frame 44. A friction clutch 55, similar to clutch 41, is connected in take-up spool 48 for the same purpose.

Driver roller 50 is connected at its upper end to a pair of bevel gears 56 for driving shaft 36 of the common drive mechanism, which provides power for driving rollers 20 to 26 in tape magazine 10. Thus, motor 52 provides a common propulsion unit for the rollers in both tape magazine 10 and unexposed tape magazine 14.

Unexposed copy film magazine is provided with an exposure slot 58 in the front wall, the slot extending for at least the width of the film to be used. Magazine 14 is connected to a camera enclosure 60 through a light-tight enclosure 62 which supports motor 52. Enclosure 60 can be for practical purposes a modified speed graphic camera, although any light-tight enclosure can be used as no adjustments are needed after the equipment is assembled. Camera lens 64 is placed at twice the focal length from both the tape being copied and the copy film in order to produce a 1-to-1 ratio reproduction. The image on tape 18 is reflected by a mirror 66 supported at a 45-degree angle position to the light path 68 to reverse the image so that it will appear in its original order on unexposed film 42. Mirror 66 is housed in a hood 67. The camera shutter, not shown, is open throughout the entire filming operation.

The operation of tape reproducer 8 is apparent from the foregoing description. Tape 18 to be reproduced is placed on storage roll 20 in tape transport magazine 10, and is threaded around driver roller 22, exposure roller 24 and tied to take-up roller 26. Likewise unexposed film 42 is placed on storage roller 46 in unexposed film magazine 14 and is threaded around driver roller 54 which also serves as the exposure roller. Drive motor 52 and common drive mechanism 16 insures that the speed of both tape 18 and film 42 are synchronized, travelling in the directions indicated by the arrows. The images on tape 18 around exposure roller 24 are reflected and reversed in position by mirror 66, following the optical path 68 through exposure slot 58 on to the unexposed film 42. As previously indicated unexposed film 42 is moved past exposure slot 58 at the same rate of speed and in the same optical direction as oscillograph tape 18 which is being copied. The camera shutter is open through the film operation, and since the tape and film are moving, a continuous reproduction is produced for the entire length of the tape. The sensitized paper film 42 may be the same type of paper normally used for oscillograph recordings 18, and while the copy is a negative of the original, namely white on black, instead of black on white, this has been proven in practice to have no adverse effect on its readability. The copy could be used as a master for further reproduction when a positive image is required.

While the reproducer of this invention has been used for reproducing oscillograph tapes of 3⅝ inches in width, larger and different kinds of tapes can be reproduced as well as colored tapes by using suitable color film in the film magazine. It has been found in practice that the invention apparatus can copy oscillograph tape at a rate of 5 ft./min. as compared to an ozalid copy machine used in the past for this type of reproduction which operated at a speed of about 1 ft./min.

Obviously many modifications and variations of the present invention are possible in the light of the above teachings. It is therefore to be understood that within the scope of the appended claim the invention may be practiced otherwise than as specifically described.

I claim:

Apparatus for accurately reproducing a relatively narrow elongated roll of tape containing test indicia thereon comprising:

a first magazine for housing a strip of tape to be reproduced, said magazine including a storage spool and a drive roller adjacent said spool and positioned to withdraw tape from the storage spool;

an exposure roller immediately outside said first magazine to present successive portions of said tape for ready viewing thereof, and a takeup roller within the first magazine and driven from the drive roller to receive and store the tape after it has been exposed;

a friction slip clutch drive assembly associated with said takeup roller;

a second magazine spaced from the first magazine and having a spool for storing a strip of photosensitive material;

a drive roller to present said photosensitive strip for sequential exposure to the indicia on the tape;

a takeup spool driven by the drive spool;

a friction slip clutch drive assembly associated with said takeup spool;

one wall of said magazine having a slit therethrough adjacent to and extending transversely of the direction of strip movement over the drive roller;

means for guiding said strip past the slit;

a photographic enclosure defining an optical path interposed between the two magazines;

said enclosure including an image inverting means for reversing the image on the tape so that it will appear on the exposed photosensitive strip in its original order; and common drive means interconnecting said magazine drive rollers to impart simultaneous movement thereto whereby an image received from the first magazine is picked up by the photosensitive strip and stored in the second magazine at the same rate that it is exposed by the strip of tape emitting from the first magazine.

References Cited by the Examiner

UNITED STATES PATENTS

| 1,143,521 | 6/1915 | Faber. | |
| 1,204,098 | 11/1916 | Watson | 88—24 |
| 1,539,322 | 5/1925 | Morton | 88—24 |
| 2,358,649 | 9/1944 | Landrock et al. | 88—24 |
| 2,672,074 | 3/1954 | Gundby | 88—24 |
| 3,005,388 | 10/1961 | Limberger | 95—1.7 |
| 3,005,389 | 10/1961 | Limberger | 95—1.7 |
| 3,146,100 | 8/1964 | Kaufman | 95—1.7 X |

FOREIGN PATENTS

| 121,591 | 2/1900 | Germany. |

EVON C. BLUNK, *Primary Examiner.*